July 26, 1932.   J. C. LINCOLN   1,869,351
METHOD AND APPARATUS FOR MAKING PIPE
Filed Feb. 25, 1928    2 Sheets-Sheet 2
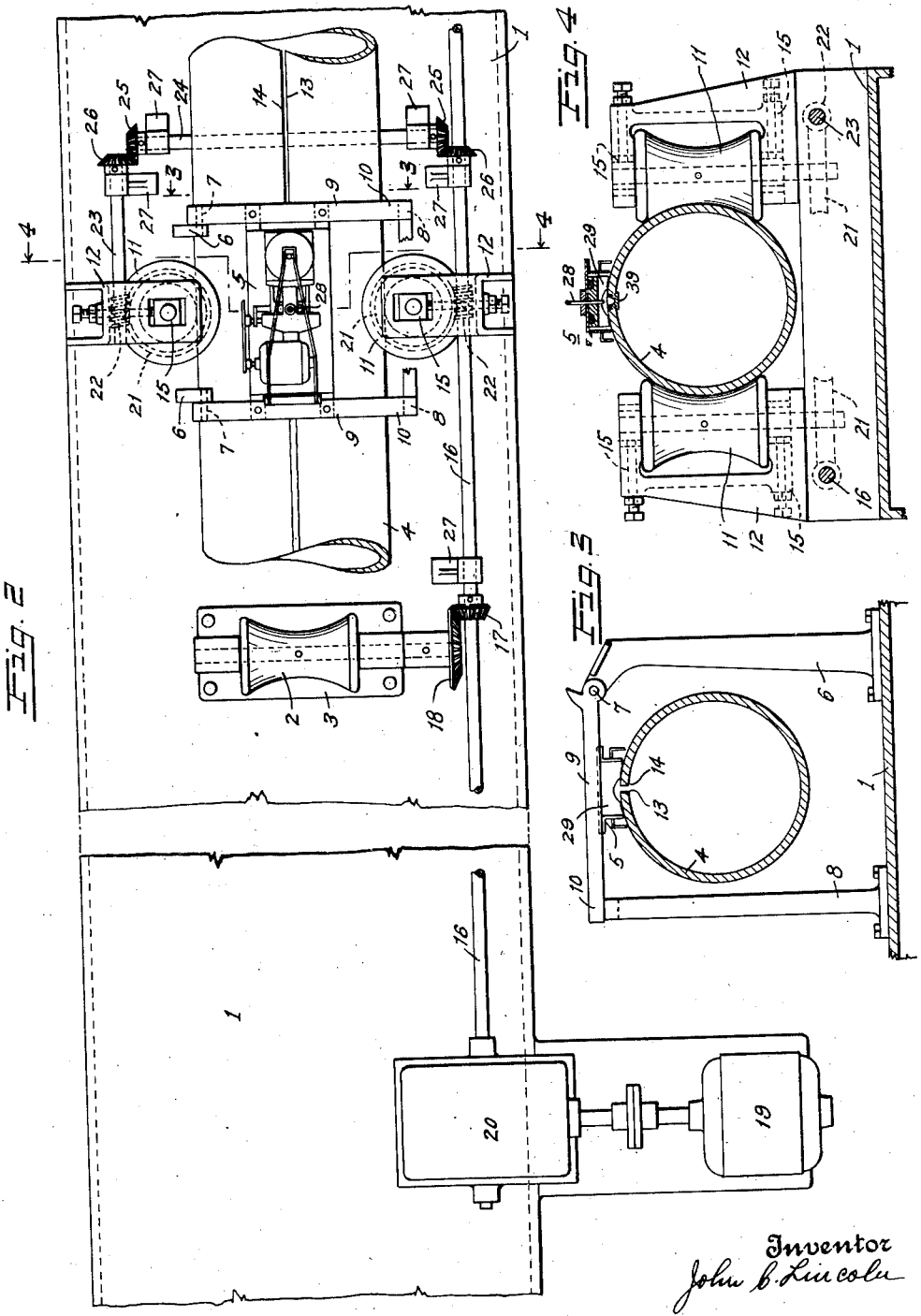

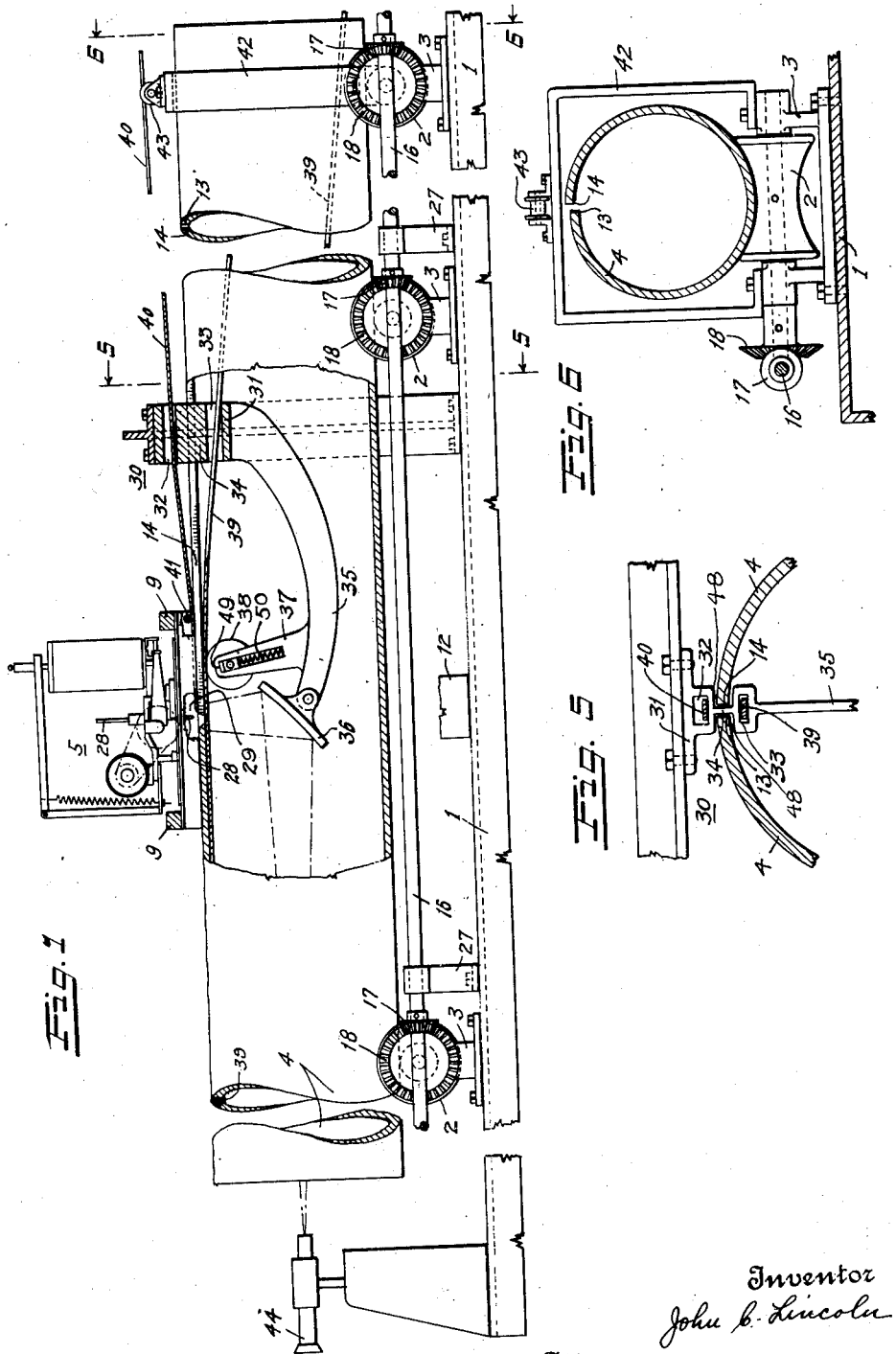

Patented July 26, 1932

1,869,351

UNITED STATES PATENT OFFICE

JOHN C. LINCOLN, OF CLEVELAND, OHIO, ASSIGNOR TO THE LINCOLN ELECTRIC COMPANY, OF CLEVELAND, OHIO, A CORPORATION OF OHIO

METHOD AND APPARATUS FOR MAKING PIPE

Application filed February 25, 1928. Serial No. 256,840.

The invention relates in general to the art of making pipe, and more particularly to a system for welding the seam in pipe made from sheet material.

In welding the seam of welded pipe it is desirable that the weld be smooth, flexible, strong and uniform, and that it extend entirely through the wall of the pipe. By practising the system of the invention a pipe may be made having these properties.

Apparatus for practising the invention may comprise a welding unit and devices for moving the pipe relatively to it. The welding unit may carry an electrode between which and the pipe the welding arc is drawn, a housing for effectively shielding the arc from the air, and an electromagnet for steadying the position of the arc. The pipe welding apparatus may also include suitable guide devices for guiding inner and outer welding strips for improving the character of the weld. A mirror may be provided within the pipe and a telescope at the end of the pipe by which the condition of the weld at the welding point may be continuously observed and the rate of relative movement of the pipe and unit may be controlled accordingly. The welding apparatus may include in addition suitable guide devices for guiding the adjacent edges of the seam in the pipe to place them in true aligned relation at the welding point.

The invention also consists in certain new and original features and combinations hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation partly in section of apparatus according to the invention;

Fig. 2 is a plan view of the apparatus shown in Fig. 1;

Fig. 3 is a section on the line 3—3 of Fig. 2;

Fig. 4 is a section on the line 4—4 of Fig. 2;

Fig. 5 is a detail taken on the line 5—5 of Fig. 1; and

Fig. 6 is a section taken on the line 6—6 of Fig. 1.

In the following description and in the claims parts will be identified by specific names for convenience, but they are intended to be as generic in their application to similar parts as the art will permit.

Like reference characters denote like parts in the several figures of the drawings.

Referring now to the drawings, and more particularly to Figs. 1 and 2, the apparatus for carrying out the invention comprises a pipe-way which may include a long base 1 and a plurality of horizontally disposed rollers 2, each roller being suitably journaled on a supporting bracket 3 secured to the base 1. Each roller 2 is concave in section to fit the pipe 4 and is for the purpose of guiding and impelling the pipe along the pipe-way.

Disposed along the pipe-way is a welding unit 5 mounted over the pipe and including front and rear transverse supporting members 9. The unit 5 is hingedly connected to a pair of columns 6 on one side by pivots 7 and may rest on the columns 8 on the other side, the columns 6 and 8 resting upon the base 1. One or both transverse members 9 may have a projection 10 engageable with the columns 6 to limit the movement of the unit 5 about the pivots 7 and to allow the unit to be swung away from the pipe to a non-operative position.

Mounted at the welding unit is a pair of vertical squeeze rollers 11, each squeeze roller being mounted in a bracket frame 12 supported on the base 1. Each roller is concave in section to fit the pipe and both together operate to firmly abut the edges 13 and 14 of the seam for welding. Suitable adjusting devices 15 are provided for adjusting the distance between the squeeze rollers.

The horizontal and vertical rollers are driven by suitable driving mechanism. The driving mechanism comprises a long shaft 16 running the length of the pipe-way, the shaft being provided with a bevel gear 17 at each horizontal roller 2. On the shaft of each horizontal roller 2 is another bevel gear 18 meshing with the bevel gears 17. A suitable electric motor 19 and gearing 20 is provided for driving the longitudinal shaft 16.

Mounted on the shaft of each squeeze roller 11 is a worm wheel 21, each worm wheel meshing with a worm 22. One worm 22 is mounted directly on the longitudinal shaft 16 and the other worm 22 is mounted upon a counter shaft 23. Motion is imparted to the counter shaft 23 from the longitudinal shaft 16 by means of a transverse shaft 24 having bevel gears 25 thereon meshing with bevel gears 26 on the counter shaft and on the longitudinal shaft. It will be understood that suitable bearing brackets 27 are provided for supporting the several shafts where needed.

So far as the present application is concerned, it suffices to know that the welding unit comprises a frame held stationary by the transverse members 9. The frame carries the electrode 28 which may be of carbon and is for the purpose of drawing the welding arc from the work. The electrode has suitable means for feeding and may be continuously rotated about its own axis to obtain uniform consumption. A suitable housing 29 may be provided fitting the pipe to surround the arc to effectively exclude air therefrom. A suitable electromagnet may be provided to steady the position of the arc.

Mounted in front of the unit 5 is a support 30 which straddles the pipe. This support has depending therefrom (Fig. 5) a bracket 31 having a guide eye 32 outside the pipe and a guide eye 33 within the pipe connected by a thin strip 34 passing between the edges 13 and 14. Depending from the inner guide eye is a bracket 35 for supporting a concave mirror 36 which is pivotally mounted thereon for a purpose hereinafter described. The bracket 35 also carries a pair of spaced arms 37 having a roller 38 journalled therebetween. Each arm 37 has a guide slot 49 in which is slidably mounted a bearing block for the roller 38. A spring 50 is placed in each slot between the end thereof and the bearing block. The bracket 31 is also provided with guide channels 48 to guide and force the adjacent edges 13 and 14 of the seam into alignment as hereinafter described.

It will be understood that the lower eye 33 guides the lower backing strip 39 while the upper eye 32 guides the upper strip 40. One function of the roller 38 is to hold the lower strip 39 against the inside of the seam and a roller 41 is provided on the unit 5 to hold the upper strip 40 against the seam just in front of the welding point. A plurality of frames 42 are provided, (Figs. 1 and 6) being supported by the roller brackets 3 along the pipe-way, each having a guide roller 43 for supporting the upper strip 40.

The pre-rolled pipe may not have its adjacent edges 13 and 14 in alignment but the edges may be out of alignment as illustrated in Fig. 6. The guide channels 48 come into use to align the uneven edges 13 and 14 and to aid in holding them in alignment. The spring pressed roller 38 also assists in holding the adjacent edges of the seam in register so that the weld may be smooth and strong. The roller 38 is preferably disposed quite close to and substantially at the welding point to insure holding the edges in true register during welding. The slot between the edges 13 and 14 is wedge-shaped, the squeeze rolls 11 placing the edges in abutting relation at the welding point, while the thin connecting plate 34 holds the edges in spaced relation.

To use the apparatus the pipe which is previously rolled into an approximate cylinder from a flat plate is placed upon the horizontal rollers 2 at the front end of the pipe-way and is allowed to be conveyed to the unit 5. The upper welding strip 40 and the lower welding strip 39 are placed in position and the arc is struck and the pipe is allowed to be fed through the machine, the aligned edges 13 and 14 of the seam being squeezed by the squeeze rollers 11 at the welding point.

The upper strip 40 comprises an upper layer of filling metal coated with a lower layer of flux which may be water glass or borax or any other salt having water of crystallization. The lower strip 39 may be of welding metal. The filling metal of the upper strip is for the purpose of increasing the cross section of the weld, and the flux is for the purpose of causing a highly reducing or neutral atmosphere around the arc within the housing 29.

As the arc melts the metal of the edges 13 and 14, a crater is formed which is preferably allowed to penetrate entirely through the thickness of the metal. The under-strip 39 then prevents leakage of the molten metal. The edges 13 and 14 of the seam and the filling strip melt to form the local casting which forms the weld. The lower strip 39 may be partially melted by the arc and become a part of the seam, thereby increasing the strength thereof.

The speed of movement of the pipe is controlled by the operator who observes the action of the arc through the telescope 44, the mirror 36 reflecting the welding point and magnifying it. The speed of the pipe along the pipe-way is controlled by the condition of the weld, the speed being preferably such that the weld is allowed to penetrate entirely through the thickness of the metal to cause the under-strip 39 to become a part of the welded seam.

Thus the apparatus allows the pipe to be made with a seam which is smooth, ductile, deep and uniform. The provision of means by which the operator may observe the action of the arc aids in making a uniform and deep weld which may penetrate the thickness of the metal. The upper strip and lower strip are effectively guided so that, when the pipe is once started, the entire length thereof may be welded without any further adjustment, except as above pointed out, to control the travel of the pipe according to the condition of penetration of the weld.

In the claims it is intended that the term "pipe" be broad enough to cover any tubular structure, whether known in the art as a pipe or tube or cylindrical shell.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. In apparatus for welding pipe, a welding unit, means for squeezing the edges of the seam of the pipe to be welded together at said unit, an outer guide in front of said unit outside said pipe for an outer welding strip, an inner guide inside said pipe for an inner welding strip, a mirror within said pipe at said unit, and means for moving said pipe relatively to said unit, guides and mirror.

2. In apparatus for welding pipe, a pipeway comprising squeeze rollers for squeezing the adjoining edges of the pipe seam together, a welding unit disposed along said pipe-way, a support in front of said unit comprising an outer guide outside said pipe for an upper welding strip and an inner guide within said pipe for a lower welding strip, said guides being joined by a narrow connector passing between the unconnected edges of the seam, a mirror connected to said inner guide, means pressing said inner strip against said seam in front of the welding point, means for pressing said outer strip against the seam in front of the welding point and means for advancing said pipe along said pipe-way.

3. In apparatus for welding pipe, a pipeway comprising a pair of vertical squeeze rollers between which the adjoining edges of the pipe seam are squeezed together, supports on either side of the pipe at said squeeze rollers, a welding unit disposed on said supports over said pipe, said unit comprising an electrode between which and the pipe the welding arc is drawn and an air-tight housing surrounding said electrode and fitting close to said pipe, a support in front of said unit comprising an outer guide outside said pipe for an outer welding strip and an inner guide within said pipe for an inner welding strip, said guides being joined by a narrow connector passing between the unconnected edges of the seam, an arm connected to said lower guide, a concave mirror on said arm, a telescope at the rear end of the pipeway, a roller on said arm pressing said inner strip against said seam in front of the welding point, a roller on said unit for holding said outer strip against the seam in front of the welding point and horizontal rollers along said pipe-way for advancing said pipe.

4. In apparatus for welding pipe, a pipe support, a welding unit positioned at the seam and on one side of the pipe wall, a guide member disposed at the seam on the other side of said pipe wall and substantially at the welding point, and means for yieldably holding said guide member against said pipe wall.

5. In apparatus for welding pipe, a welding unit, guide devices in front of said unit for aligning the edges of the seam, squeezing devices at the unit for pressing the edges of the seam together, a guide member positioned inside said pipe opposite said welding unit, means for relatively moving said pipe and aforesaid apparatus, and means for yieldably holding said guide member against said pipe wall.

6. In apparatus for welding pipe, a pipe support, a welding unit and squeezing devices on said pipe support for bringing the edges of the pipe together, said squeezing devices being located at the welding unit only, a guide device in front of said unit and said squeezing devices, said guide device comprising a thin member disposed between the edges of the pipe, an outer guide member outside said pipe and an inner guide member inside said pipe both connected to said thin member, said thin member holding said outer and inner guide members thereby to form guide channels for aligning the edges of the pipe.

7. In pipe welding apparatus, a welding unit, a pipe support adjacent said unit, a guide for an outer welding strip disposed adjacent said unit and positioned so as to be outside the pipe to be welded, a second guide for an inner welding strip disposed adjacent said unit and positioned so as to be inside said pipe, and means for moving said pipe relatively to said unit and guides along said support.

8. In pipe welding apparatus, a welding unit, a pipe support adjacent said unit, a guide for an outer welding strip disposed adjacent said unit and positioned so as to be outside the pipe to be welded, a second guide for an inner welding strip disposed adjacent said unit and positioned so as to be inside said pipe, means for moving said pipe relatively to and said unit and guides along said support, and a connecting piece extending between said guides and positioned to pass between the edges of the seam to be welded.

9. In pipe welding apparatus, an arc welding unit comprising an electrode positioned so as to be adjacent the seam of the pipe to be welded, a pipe support opposite said unit, a guide for an outer welding strip positioned so as to be adjacent the pipe seam and outside the pipe, and means for moving said pipe relatively to said unit and guide along said support.

10. In pipe welding apparatus, an arc welding unit comprising an electrode positioned adjacent the seam of the pipe to be welded so as to draw an arc with said seam, a pipe support adjacent said unit, a guide for an inner welding strip positioned so as to be adjacent the pipe seam and inside the pipe, and means for moving said pipe relatively to said unit and guide along said support.

11. In pipe welding apparatus, a welding unit, a pipe support adjacent said unit, a mirror adjacent said unit and positioned so as to be inside the pipe to be welded, means whereby movement of the pipe relative to said mirror and welding unit is effected along said support, and a telescope in line with said pipe for observing the weld as reflected in said mirror.

12. In pipe welding apparatus, a welding unit, a pipe support adjacent said unit, a mirror adjacent said unit and positioned so as to be inside the pipe to be welded for observing the weld, and means whereby movement of said pipe relative to said unit and mirror is effected along said support.

13. In apparatus for welding pipe, a pipe support, a welding unit, a guide device near said welding unit comprising a thin member positioned between the edges of the seam and outer and inner guide members positioned on opposite sides of said seam and secured to said thin member, said thin member holding said outer and inner guide members thereby to form guide channels for aligning the edges of said pipe.

In testimony whereof I have hereunto set my hand.

JOHN C. LINCOLN.